(12) United States Patent
Campbell et al.

(10) Patent No.: US 10,326,904 B2
(45) Date of Patent: *Jun. 18, 2019

(54) ON-CHIP IMAGE SENSOR DATA COMPRESSION

(71) Applicant: GoPro, Inc., San Mateo (CA)

(72) Inventors: Scott Patrick Campbell, Belmont, CA (US); David A. Newman, San Diego, CA (US); Brian G. Schunck, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,305

(22) Filed: Jul. 31, 2018

(65) Prior Publication Data

US 2018/0338060 A1     Nov. 22, 2018

Related U.S. Application Data

(63) Continuation of application No. 15/445,166, filed on Feb. 28, 2017, now Pat. No. 10,044,899, which is a
(Continued)

(51) Int. Cl.
*H04N 5/374* (2011.01)
*H04N 5/341* (2011.01)
(Continued)

(52) U.S. Cl.
CPC ....... *H04N 1/2137* (2013.01); *H04N 1/00209* (2013.01); *H04N 5/23206* (2013.01);
(Continued)

(58) Field of Classification Search
CPC ............... H04N 1/2137; H04N 19/137; H04N 1/00209; H04N 19/63; H04N 19/625;
(Continued)

(56) References Cited

U.S. PATENT DOCUMENTS 6,452,632 B1    9/2002   Umeda
7,110,025 B1 *  9/2006   Loui ...................... H04N 5/232
                                                          348/220.1
(Continued)

FOREIGN PATENT DOCUMENTS

JP     2008288906 A    11/2008
WO     2011024384 A1    3/2011

OTHER PUBLICATIONS

Office Action for U.S. Appl. No. 13/436,540, dated Aug. 30, 2013, 13 Pages.
(Continued)

*Primary Examiner* — Shahbaz Nazrul
(74) *Attorney, Agent, or Firm* — Young Basile Hanlon & MacFarlane, P.C.

(57) ABSTRACT

Systems and methods are disclosed that capture and compress frames of pixel data. In an implementation, an image sensor chip is configured to convert light into pixel data and generate compressed pixel data at a variable compression rate including applying a transform to pixel data associated with a pixel category from a plurality of pixel categories. The variable compression rate is within an available bandwidth of an output bus configured to output the compressed pixel data.

20 Claims, 5 Drawing Sheets

Related U.S. Application Data continuation of application No. 15/096,479, filed on Apr. 12, 2016, and a continuation of application No. 14/603,563, filed on Jan. 23, 2015, now Pat. No. 9,338,373, and a continuation of application No. 14/174,812, filed on Feb. 6, 2014, now Pat. No. 8,970,726, and a continuation of application No. 13/436,540, filed on Mar. 30, 2012, now Pat. No. 8,687,086.

(51) Int. Cl.

| | | |
|---|---|---|
| H04N 19/156 | (2014.01) | |
| H04N 5/335 | (2011.01) | |
| H04N 1/21 | (2006.01) | |
| H04N 19/137 | (2014.01) | |
| H04N 19/426 | (2014.01) | |
| H04N 19/423 | (2014.01) | |
| H04N 9/04 | (2006.01) | |
| H04N 19/91 | (2014.01) | |
| H04N 19/625 | (2014.01) | |
| H04N 5/232 | (2006.01) | |
| H04N 1/00 | (2006.01) | |
| H04N 19/172 | (2014.01) | |
| H04N 19/63 | (2014.01) | |

(52) U.S. Cl.
CPC .............. *H04N 5/335* (2013.01); *H04N 5/341* (2013.01); *H04N 5/374* (2013.01); *H04N 9/045* (2013.01); *H04N 19/137* (2014.11); *H04N 19/156* (2014.11); *H04N 19/172* (2014.11); *H04N 19/423* (2014.11); *H04N 19/426* (2014.11); *H04N 19/625* (2014.11); *H04N 19/63* (2014.11); *H04N 19/91* (2014.11)

(58) Field of Classification Search
CPC ............... H04N 19/172; H04N 19/156; H04N 5/23206; H04N 5/374; H04N 19/91; H04N 9/045; H04N 19/423; H04N 19/426; H04N 5/341; H04N 5/335
See application file for complete search history.

(56) References Cited

U.S. PATENT DOCUMENTS

| 7,173,651 | B1 | 2/2007 | Knowles | |
|---|---|---|---|---|
| 8,014,597 | B1 | 9/2011 | Newman | |
| 8,179,971 | B1* | 5/2012 | Gough | H04N 19/88 375/240.18 |
| 2002/0191854 | A1* | 12/2002 | Kakarala | G06T 3/4015 382/240 |
| 2003/0007089 | A1* | 1/2003 | Rosiene | H04N 19/63 348/384.1 |
| 2003/0160883 | A1 | 8/2003 | Ariel | |
| 2003/0174772 | A1 | 9/2003 | Voronov | |
| 2003/0235248 | A1 | 12/2003 | Kim | |
| 2004/0135903 | A1 | 7/2004 | Brooks | |
| 2004/0156616 | A1 | 8/2004 | Strub | |
| 2004/0264789 | A1* | 12/2004 | Akiyama | H04N 1/2112 382/239 |
| 2005/0091695 | A1 | 4/2005 | Paz | |
| 2006/0184982 | A1 | 8/2006 | Paz | |
| 2007/0009249 | A1 | 1/2007 | Kim | |
| 2007/0097239 | A1 | 5/2007 | Kaplinsky | |
| 2007/0223824 | A1 | 9/2007 | Kato | |
| 2007/0252074 | A1 | 11/2007 | Ng | |
| 2008/0007636 | A1 | 1/2008 | Cernasov | |
| 2008/0012953 | A1 | 1/2008 | Yang | |
| 2008/0159387 | A1* | 7/2008 | Dvir | H04N 19/176 375/240.03 |
| 2008/0240593 | A1 | 10/2008 | Tsai | |
| 2009/0174811 | A1 | 7/2009 | Sung | |
| 2010/0289904 | A1 | 11/2010 | Zhang | |
| 2011/0010405 | A1 | 1/2011 | Gupta | |
| 2011/0025869 | A1 | 2/2011 | Lee | |
| 2011/0141318 | A1 | 6/2011 | Lee | |
| 2012/0147209 | A1 | 6/2012 | Hiraoka | |
| 2015/0281539 | A1 | 10/2015 | Ueki | |
| 2015/0312476 | A1 | 10/2015 | Wakabayashi | |

OTHER PUBLICATIONS

Office Action for U.S. Appl. No. 14/174,814, dated Jun. 16, 2014, 14 Pages.

U.S. Office Action for U.S. Appl. No. 14/174,812, dated Apr. 24, 2014, 18 pages.

U.S. Office Action for U.S. Appl. No. 14/174,812, dated Oct. 23, 2014, 17 pages.

Office Action for U.S. Appl. No. 14/174,814, dated May 22, 2015, 12 Pages.

Office Action for U.S. Appl. No. 14/603,563, dated Nov. 18, 2015, 11 Pages.

Office Action for U.S. Appl. No. 14/603,563, dated May 12, 2015, 20 Pages.

Robucci, Ryan, et al. "Compressive sensing on a CMOS separable-transform image sensor." Proceedings of the IEEE98.6 (2010): 1089-1101.

Aizawa, Kiyoharu, et al. "Computational image sensor for on sensor compression." IEEE transactions on electron devices44.10 (1997): 1724-1730.

Aizawa, Kiyoharu, et al. "On sensor image compression." IEEE transactions on circuits and systems for video technology 7.3 (1997): 543-548.

Yoon, Kwangho, et al. "Single-chip CMOS image sensor for mobile applications." IEEE Journal of Solid-State Circuits37.12 (2002): 1839-1845.

Kawahito, Shoji, et al. "A CMOS image sensor with analog two-dimensional DCT-based compression circuits for one-chip cameras." IEEE Journal of solid-state circuits 32.12 (1997): 2030-2041.

Chen, Shoushun, Amine Bermak, and Yan Wang. "A CMOS image sensor with on-chip image compression based on predictive boundary adaptation and memoryless QTD algorithm." IEEE Transactions on Very Large Scale Integration (VLSI) Systems 19.4 (2011): 538-547.

Fossum, Eric R. "CMOS image sensors: Electronic camera-on-a-chip." IEEE transactions on electron devices 44.10 (1997): 1689-1698.

Tsai, Y. Tim. "Color image compression for single-chip cameras." IEEE Transactions on Electron Devices 38.5 (1991): 1226-1232.

\* cited by examiner

ON-CHIP IMAGE SENSOR DATA COMPRESSION

CROSS-REFERENCE TO RELATED APPLICATION(S)

This application is a continuation of U.S. application Ser. No. 15/445,166, filed on Feb. 28, 2017, which is a continuation of U.S. application Ser. No. 15/096,479, filed Apr. 12, 2016, which is a continuation of U.S. application Ser. No. 14/603,563, filed Jan. 23, 2015, now U.S. Pat. No. 9,338,373, which is a continuation of U.S. application Ser. No. 14/174,812, filed Feb. 6, 2014, now U.S. Pat. No. 8,970,726, which is a continuation of U.S. application Ser. No. 13/436,540, filed Mar. 30, 2012, now U.S. Pat. No. 8,687,086, each of which is incorporated by reference in its entirety.

TECHNICAL FIELD

This disclosure relates to image capturing, and more specifically, to the compression of image data in an image sensor chip, prior to transmission to a digital signal processor (DSP).

DESCRIPTION OF THE RELATED ARTS

The advancement of digital video and image encoding has led to increasingly sophisticated image capture techniques at increasingly high resolutions and frame rates. For instance, common media formats, such as Blu-Ray discs, internet video, and cable/satellite television, are able to display content at a 1080P resolution (1920×1080 pixels progressively scanned) at 60 frames per second ("fps"). Certain displays are able to display resolutions of 2560×2048 pixels or 3260×1830 pixels or higher at frame rates of 120 frames per second or higher. As encoding and display technology advances, frame rates and resolutions will increase accordingly.

The capture of digital images by an image capture device (hereinafter "camera") is performed by an image sensor. Many types of image sensors are commonly used in cameras and other image-capturing devices, such as charge-coupled devices (CCDs) and complementary metal-oxide-semiconductors (CMOSs). Image sensors convert light, such as light entering the aperture of a camera lens through a camera lens, into image information. In this way, a camera can "capture" objects before it by converting the light reflected from the objects and passing through the camera lens into an image.

Image data from image sensors must often be processed into a particular image format prior to the image being rendered by a display. Image data is typically processed by a DSP, which is often located off-chip from the image sensor. Image sensors and DSPs are typically connected by buses coupled to the image sensors' pins and the DSPs' pins. As image resolution and frame rate increase, the amount of image data produced by the image sensor increases, along with the amount of power required to accommodate the transfer of image data from the image sensor to the DSP. In some circumstances, the amount of power required to accommodate such a transfer of image data rapidly depletes the battery life of a camera, or exceeds the amount of power available to the camera. In addition, increasing the power consumption in transferring image data correlatively increases the noise (such as the electromagnetic noise) impacting the image data.

The limited ability to transfer image data between an image sensor and a DSP thus creates a bottleneck in the image capture process. One solution is to increase the number of pins on the image sensor and DSP to increase the bus bandwidth between the image sensor and DSP. Such a solution, however, may not be physically possible due to the limited real estate of many image sensor chips and DSPs. Alternatively, images or video may be captured at a lower resolution and at a lower frame rate to reduce the power-limiting bandwidth requirements between the image sensor and the DSP. However, this solution results in a lower quality image or video. Thus, camera makers are increasingly required to balance the competing requirements of image and video quality with power consumption and chip real estate.

SUMMARY

Disclosed herein are implementations of systems and techniques for on-chip image sensor data compression.

In an implementation, an image capture system is provided. The image capture system includes an image sensor chip configured to convert light into pixel data and generate compressed pixel data at a variable compression rate including applying a transform to pixel data associated with a pixel category from a plurality of pixel categories, wherein the variable compression rate is within an available bandwidth of an output bus configured to output the compressed pixel data.

In an implementation, an image sensor chip is provided that includes a complementary metal-oxide-semiconductor component configured to convert light to pixel data, wherein the image sensor chip is configured to organize the pixel data into groups of pixel data based on a color filter and a compression engine configured to transform code the groups of pixel data and generate compressed pixel data based on the transform coded groups of pixel data within an available bandwidth of an output bus configured to output the compressed pixel data.

In an implementation, a method is provided for capturing and compressing frames of pixel data. The method includes converting, by an image sensor chip, light into pixel data, the pixel data organized into groups of pixel data according to pixel categories, generating compressed pixel data by the image sensor chip using a transform coding of groups of pixel data, the compressed pixel data generated at a rate that is within an available bandwidth of an output bus of the image sensor chip, and transmitting, using the output bus, the compressed pixel data to a digital signal processor for decompression and recompression into a video data format.

These and other aspects of the present disclosure are disclosed in the following detailed description, the appended claims, and the accompanying figures.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An image capture system provides photographers, professional and amateur, a configuration for capturing images and video at resolutions and frame rates which previously required a performance-limiting amount of power for many camera configurations. The cameras described herein may be consumer grade while the configuration of the cameras allows for the transfer of image data between an image sensor and a DSP at high resolutions and frame rates without the expense of professional grade equipment.

The image capturing system described herein could be used to allow consumers to capture high-resolution and high-frame rate images and video of local events or activities, including sporting events, theater performances, concerts, weddings, or other events without requiring a professional photographer and advanced camera equipment. It should be noted that for the purposes described herein, video capture is performed by the capture of successive images ("frames"), and thus functionality described herein making reference to one of either video capture or image capture is applicable to both.

Image Capture System Overview

Figure 1:
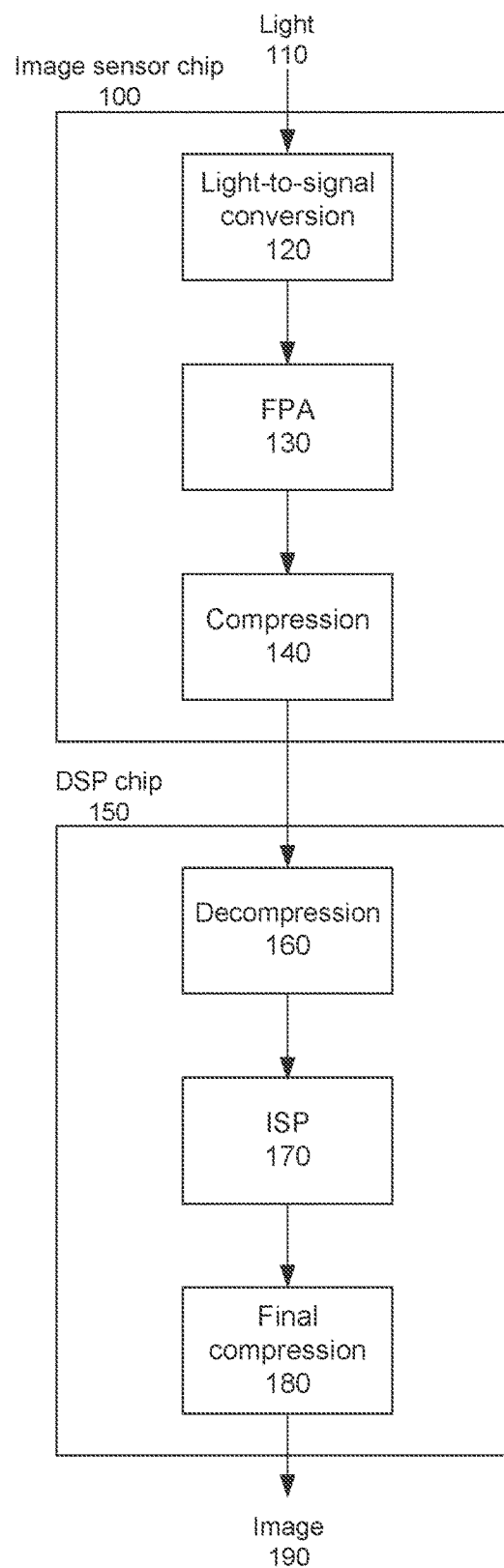
FIG. 1 is a block diagram illustrating an embodiment of an image capture system.

FIG. 1 is a block diagram illustrating an example embodiment of an image capture system. The image capture system includes an image sensor chip 100 and a DSP chip 150, each of which may be contained within a camera. Light 110 enters the image sensor chip 100 through, for example, a camera lens and aperture, and is converted into compressed pixel data. The compressed pixel data is sent to the DSP chip 150, where it is converted into a formatted image and output as the image 190.

The light 110 is received by the image sensor chip 100 at a light-to-signal conversion module 120. The light-to-signal conversion module 120 converts the light into an electrical signal that is received by a focal plane array (FPA) 130. In one embodiment, the light-to-signal conversion module converts the received light 110 into voltages representing properties of the received light 110, for example frequency, wavelength, intensity, magnitude, and the like. The FPA 130 converts the electrical signals from the light-to-signal conversion module 120 into pixel data. In one embodiment, the FPA 130 outputs pixel data sequentially for each frame of video captured by the image sensor chip 100. It should be noted that although the functionality of the light-to-signal conversion module 120 and the FPA 130 are discussed separately herein, the FPA 130 may perform the functionality of the both modules.

The pixel data produced by the FPA 130 may be spatial in form. For instance, the pixel data may include a description of image data for each of a plurality of image locations ("pixels") within (for example) a rectangle of light (the "pixel array") captured by the image sensor (the "image"). The pixel data may include, for each pixel in the image, an address within the image representing the location of the pixel in the image, such as an x-coordinate and y-coordinate or other unique location identifier. Pixel data may also include, for each pixel, color information describing the pixel, grey-scale or monochrome information describing the pixel, luminance information describing the pixel, or any other information related to the pixel specifically or the display of pixels in an image generally.

The FPA 130 outputs the pixel data to the compression engine 140. The compression engine 140 performs compression on the received pixel data. Any type of compression may be performed by the compression engine 140, particularly compressions known in the art to be beneficial in image and/or video compression. For example, the pixel data may be compressed using a wavelet transform or a discrete cosine transform (DCT), which may be followed by quantization and entropy encoding. The pixel data may be compressed using run-length encoding, predictive encoding, entropy encoding, adaptive dictionary algorithms, deflation, or other methods of lossless image compression. The pixel data may be compressed using color space reduction, chroma subsampling, transform codings other than wavelet transforms and DCTs, fractal compression, or other methods of lossy image compression. The pixel data may be compressed using motion compensation, such as global motion compensation, block motion compensation, variable block-size motion compensation, overlapping block motion compensation, or other methods of motion compensation. The pixel data may be compressed using 3D coding, for instance by color shifting, pixel subsampling, and enhanced video stream coding. In one embodiment, the compression engine 140 may compress data up to 3 or 4 times or more. It should be noted that the inclusion of the compression engine 140 on the image sensor chip 100 in some embodiments may increase fabrication and production costs or the image sensor chip 100, and may increase the size of the image sensor chip 100.

In one embodiment, the FPA 130 may be modified to include logic duplicated along the rows or columns of pixels within the image sensor chip 100; such logic may be configured to perform wavelet transform operations or other compression operations. For example, in an embodiment where multiple wavelet transforms are performed on pixel data, wavelet transform logic within the FPA 130 may perform a first wavelet transform on the pixel data, and the compression engine 140 may perform additional wavelet transforms on the pixel data. By including compression logic within the rows and columns of the pixels of the image sensor chip 100, the geometry of the image sensor can be beneficially utilized to improve the compression performance of the on-image sensor chip image compression. For instance, wavelet transforms may be performed on columns or rows of pixels, and utilizing the column/row configuration of the pixels of the image sensor chip 100 allows wavelet transforms to be performed without requiring a reconfiguration/re-ordering of pixel data.

The amount of compression performed by the compression engine 140 may be variable and/or situational. In one embodiment, if the output bus between the image sensor chip 100 and the DSP chip 150 is bandwidth-limited, the compression engine 140 may increase the compression on the received pixel data as needed to ensure that the compressed pixel data output by the compression engine 140 does not exceed the maximum bandwidth of an output bus of the image sensor chip. For example, if the image sensor chip 100 is capturing video resulting in 10 MB of pixel data per frame at 30 frames per second fps, and if the image sensor chip's output bus is bandwidth limited to 150 MB/s, the compression engine 140 may compress the received pixel data by a factor of 2 to reduce the total amount of data transmitted from the image sensor chip 100 to the DSP chip 150 from 300 MB to 150 MB. As the amount of pixel data and the frame rate of video increase and decrease, the amount of compression performed by the compression engine 140 may increase or decrease proportionately.

Similarly, the amount of compression performed by the compression engine 140 may increase or decrease based on the amount of power available to output pixel data to the DSP chip 150, for instance based on a power-savings setting (such as a "conserve power" mode set by a user on a camera). The amount of compression performed by the compression engine 140 may increase as the amount of power available to output pixel data decreases, and vice versa. Beneficially, the amount of power used to compress pixel data by the compression engine 140 may be less than the amount of power required to output uncompressed pixel data to the DSP chip 150, resulting in a more power-efficient solution to transfer pixel data from the image sensor chip 100 to the DSP chip 150.

The FPA 130 may output portions of the pixel data to the compression engine 140 in parallel, allowing the compression engine 140 to take advantage of properties of data parallelism when compressing the received data. For instance, the FPA 130 may output four lines of pixel data to the compression engine 140, allowing the compression engine 140 to compress four components of pixel data simultaneously. It should be emphasized that the FPA 130 may output the pixel data to the compression engine 140 serially, allowing the compression engine 140 to compress the pixel data serially, and not in parallel.

In order to compress the pixel data in parallel, the pixel data may be organized into pixel data categories. Pixel categories are groups of pixels with one or more common properties, characteristics, or qualities. In one embodiment, pixels are organized into pixel categories for the purposes of aiding or increasing the efficiency of parallel pixel compression. Examples of pixel data categories include organization by color, by color plane (such as Red, Green1, Blue, and Green2), by luminosity, by chrominance, by location or spatiality (for instance by even or odd column and row, by x and y coordinates, or by image quadrant), by entropy, by similarity to nearby pixels, by index, or by any other means of organizing or categorizing pixels.

The FPA 130 or compression engine 140 may additionally include one or more buffers, allowing the pixel data of multiple images to be buffered or stored in buffer memory simultaneously. Alternatively, the buffers may be coupled to but independent of the FPA 130 and the compression engine 140. The buffers may allow for slowdown or variable compression performance by the compression engine 140 without detrimentally affecting the overall performance of the image sensor chip 100. In one embodiment, the buffers include pixel row buffers, for instance 6-8 lines deep. In this embodiment, in addition to buffering pixel data, the buffers may be used by the compression engine 140 to store intermediary data when compressing the pixel data. For example, if the compression engine 140 is performing a wavelet transform on the pixel data, the compression engine 140 may store wavelet transform coefficients or other components of the wavelet transform in the buffer memory during the performance of the wavelet transform.

The DSP chip 150 receives the compressed pixel data at the decompression module 160. The decompression module 160 decompresses the received compressed pixel data such that the original pixel data outputted by the FPA 130 is retrieved. In one embodiment, the decompression module 160 performs the inverse of the compression performed by the compression engine 140. Thus, by compressing and decompressing the pixel data output by the FPA 130, the pixel data may be sent from the image sensor chip 100 to the DSP chip 150 while reducing the amount of bandwidth (and accordingly, power) that would otherwise be required to send such data. The decompression module 160 then outputs the retrieved pixel data to the ISP module 170.

The decompression module 160 may also downscale the retrieved pixel data, for instance during the decompression of the pixel data. Downscaling the retrieved pixel data may result in the lowering of the resolution of the pixel data. For example, if the pixel data captured by the image sensor chip is captured at a resolution of 2720×1530 pixels, the decompression module 160 may downscale the pixel data by a factor of $\sqrt{2}$, resulting in a downscaled pixel data resolution of 1920×1080 pixels.

The decompression module 160 may also perform certain image processing operations. In one embodiment, the decompression module 160 performs conversion between various color mapping schemes. For example, the decompression module 160 may convert between a Bayer scheme, an RGB scheme, an sRGB scheme, a CMYK scheme, and the like. Alternatively, these and other image processing operations may instead be performed by the ISP 170.

The ISP 170 receives the decompressed (and optionally downscaled and processed) pixel data from the decompression module 160, performs image signal processing on the decompressed pixel data, and outputs the processed data to the final compression module 180. The ISP 170 may perform any suitable image processing operation on the decompression pixel data, such as resolution adjustment, color conversion, brightness adjustment, pixel formatting adjustment, and the like. In one embodiment, the ISP 170 performs image processing as required by the final compression module 180. For example, if the final compression module 180 requires pixel data to be formatted in a particular way in order to compress the pixel data into a particular image format, the ISP 170 may accordingly format the pixel data as required by the final compression module 180.

The final compression module 180 receives the processed pixel data, formats the pixel data into a particular pixel data format, and compresses the formatted pixel data into the image 190. It should be noted that the image 190 may refer to a particular frame of video, and thus the final compression module 180 may consecutively output successive images 190 in order to output video. The final compression module 180 may output the image 190 in any suitable image and/or video format, such as the JPG format, PNG format, Bitmap format, GIF format, MOV format, AVI format, WMV format, H.264, MPEG format, raw image or movie data formats, and the like.

System Architecture

Figure 2:
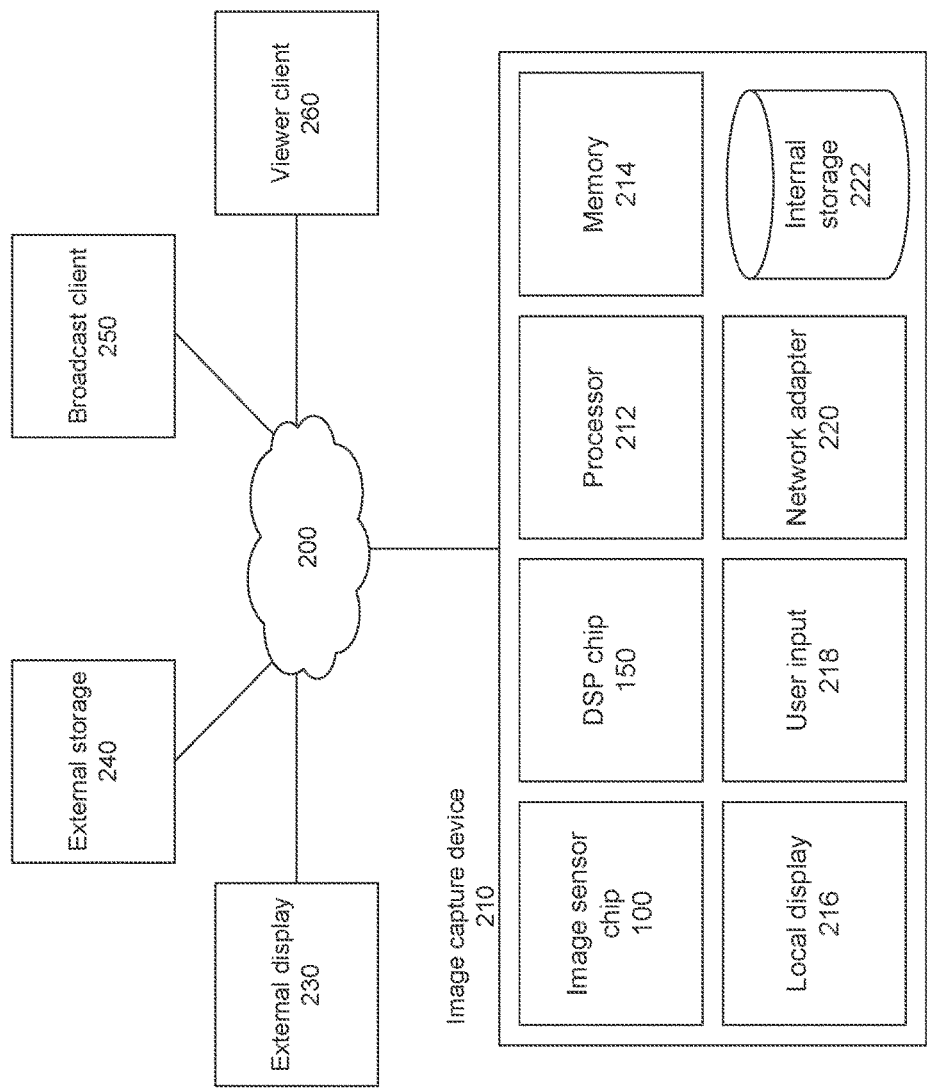
FIG. 2 is a block diagram illustrating an embodiment of an image capture and display system environment.

FIG. 2 is a block diagram illustrating an embodiment of an image capture and display system environment. In the environment of FIG. 2, an image capture device 210, an external display 230, an external storage module 240, a broadcast client 250, and a viewer client 260 all communicate through a connecting network 200. Other embodiments of such an environment may contain fewer or additional modules, which may perform different functionalities than described herein. Although only one of each component is illustrated in the environment of FIG. 2, other embodiments can have any number of each type of component, such as thousands or millions.

The image capture device 210 and other components of FIG. 2 may be implemented in computers adapted to execute computer program modules. As used herein, the term "module" refers to computer-readable program instructions and/or data for providing the specified functionality. A module can be implemented in hardware, firmware, and/or software. In one embodiment, the modules are stored on one or more storage devices, loaded into memory, and executed by the processors. Storage devices, memory, and processors are described in greater detail in the description of the image capture device 210 below; this description applies equally to any of the components of FIG. 2.

The image capture device 210 of the embodiment of FIG. 2 includes the image sensor chip 100, the DSP 150, a processor 212, memory 214, a local display 216, a user input 218, a network adapter 220, and an internal storage module 222. In other embodiment, the image capture device 210 may include fewer or additional components not shown for the purposes of simplicity. For instance, the image capture device 210 may include an internal bus, allowing the components of the image capture device 210 to communicate. In addition, not shown are common components of an image capture device 210, such as a lens, an aperture, a battery or other power supply, communication ports, speakers, a microphone, and the like. In one embodiment, the image sensor chip 100 and the DSP chip 150 are the image sensor chip 100 and the DSP chip 150 of the embodiment of FIG. 1.

The processor 212 may be any general-purpose processor. The processor 212 is configured to execute instructions, for example, instructions corresponding to the processes described herein. The memory 214 may be, for example, firmware, read-only memory (ROM), non-volatile random access memory (NVRAM), and/or RAM. The internal storage module 222 is, in one embodiment, an integrated hard disk drive or solid state memory device, though in other embodiments may be a removable memory device, such as a writeable compact disk or DVD, a removable hard disk drive, or a removable solid state memory device. The memory 214 and/or the internal storage module 222 are configured to store instructions and data that can be executed by the processor 212 to perform the functions related to the processes described herein. In one embodiment, the functionalities performed by the image sensor chip 100 or its components or the DSP chip 150 or its components are performed by the processor 212 and instructions stored in the memory 214 and/or the internal storage module 222.

The local display 216 may be implemented with an integrated LCD screen or other similar screen, such as a monochromatic display or other display. Alternatively, the local display 216 may be implemented with a removable display module, such as a LCD pack configured to couple to the image capture device 210 and communicate with the components of the image capture device 210 through an internal bus.

The local display 216 may be configured to operate as a user interface for a user of the image capture device 210. In one embodiment, the local display 216 displays menus, HUDs, UIs, and the like to allow a user to utilize the functionalities of the image capture device 210 or to inform the user of information related to the image capture device 210, such as the amount of available storage remaining, the amount of power remaining, the current resolution and/or frame rate of the image capture device 210, and any other settings or information related to the image capture device 210. In one embodiment, the image capture device 210 is configured to perform the functions of an electronic view finder, allowing a user of the image capture device 210 to view the images and/or video that the image capture device 210 will capture or is capturing responsive to a capturing action performed by a user of the image capture device 210. In one embodiment, the local display 216 is configured to display previously captured images and videos.

The user input 218 comprises a solid state and/or mechanical interface. For example, the user input 218 may include one or more buttons on the exterior of the image capture device 210. The user input 218 is configured to receive a selection action from a user of the image capture device 210 and allows the user to interact with the image capture device 210. Alternatively, the user input 218 may include a touch-screen component of the local display 216, an external input device, such as a keyboard, mouse or other controller configured to communicate with the image capture device 210 via an input port or the network adapter 220, or any other means of interacting with the image capture device 210. A user may use the user input 218 to interact with the image capture device 210 and perform functions of the image capture device 210, such as navigating through previously captured images or video, editing or deleting previously captured images or video, altering the image capture device's settings (such as the resolution or frame rate of future captured images or video, adjusting a power-save mode, or adjusting other camera parameters or settings, such as a night/day mode, a self-timer, an exposure length, and the like), turning the image capture device 210 on and off, communicating with external modules via the network adapter 220, and so forth.

The network adapter 220 communicatively couples the image capture device 210 to external modules via the connecting network 200. The network adapter 220 may include a network card, a modem, or any device configured to allow the image capture device 210 to communicate with the other components of FIG. 2 via the connecting network 200 and vice versa.

The connecting network 200 enables communications among the entities connected to it. In one embodiment, the connecting network 200 is the internet and uses standard communications technologies and/or protocols. Thus, the connecting network 200 can include links using technologies such as Ethernet, 802.11, worldwide interoperability for microwave access (WiMAX), long term evolution (LTE), 3G, and the like. Similarly, the networking protocols used on the connecting network 200 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the connecting network 200 can be represented using technologies and/or formats including the hypertext markup language (HTML), the extensible markup language (XML), and the like. At least a portion of the connecting network 200 can comprise a mobile (e.g., cellular or wireless) data network such as those provided by wireless carriers. In some embodiments, the connecting network 200 comprises a combination of communication technologies.

The external display 230 may include any type of display configured to display images or videos captured by the image capture device 210, menus or other interfaces of the image capture device 210, or any other content from the image capture device 210. For example, the external display may be a television, a monitor, a mobile phone, and the like. The external display 230 may receive content from the image capture device 210 from the image capture device via the connecting network 200, or from the external storage module 240, the broadcast client 250, and the like. In one embodiment, the image capture device 210 transmits content from the image capture device 210 to the broadcast client 250 via the internet, and the broadcast client 250 broadcasts the received content to a mobile device comprising the external display 230 via a cellular network.

The external storage module 240 is configured to receive and store content from the image capture device 210. In one embodiment, the external storage module 240 includes a database, a datacenter, an external hard disk drive, an external computer, and the like. The external storage module 240 may further be configured to provide stored content to the components of the embodiment of FIG. 2. For instance, a user may retrieve previously stored images or video from the external storage module 240 for display on the image capture device 210 or the external display 230, or for broadcasting by the broadcast client 250.

The broadcast client 250 comprises a computer or other electronic device operated by a user to create and control broadcasts of content from the image capture device. For example, in one embodiment, the broadcast client 250 includes a personal computer or mobile device executing a web browser that can retrieve content stored on the image capture device 210 or the external storage module 240. The broadcast client 250 may then broadcast the retrieved content to other entities via the connecting network 200.

The viewer client 260 is a computer or other electronic device used by one or more users to view broadcasts generated and served by the broadcast client 250. For example, in one embodiment, the viewer client 260 includes a personal computer or mobile device executing a web browser. A user can access the broadcast client 250 using the viewer client 260, and can use the available tools to browse and/or search for available broadcasts, or view a selected broadcast. In one embodiment, the external display 230 and the viewer client 260 are implemented in the same entity.

Operational Configurations

Figure 3:
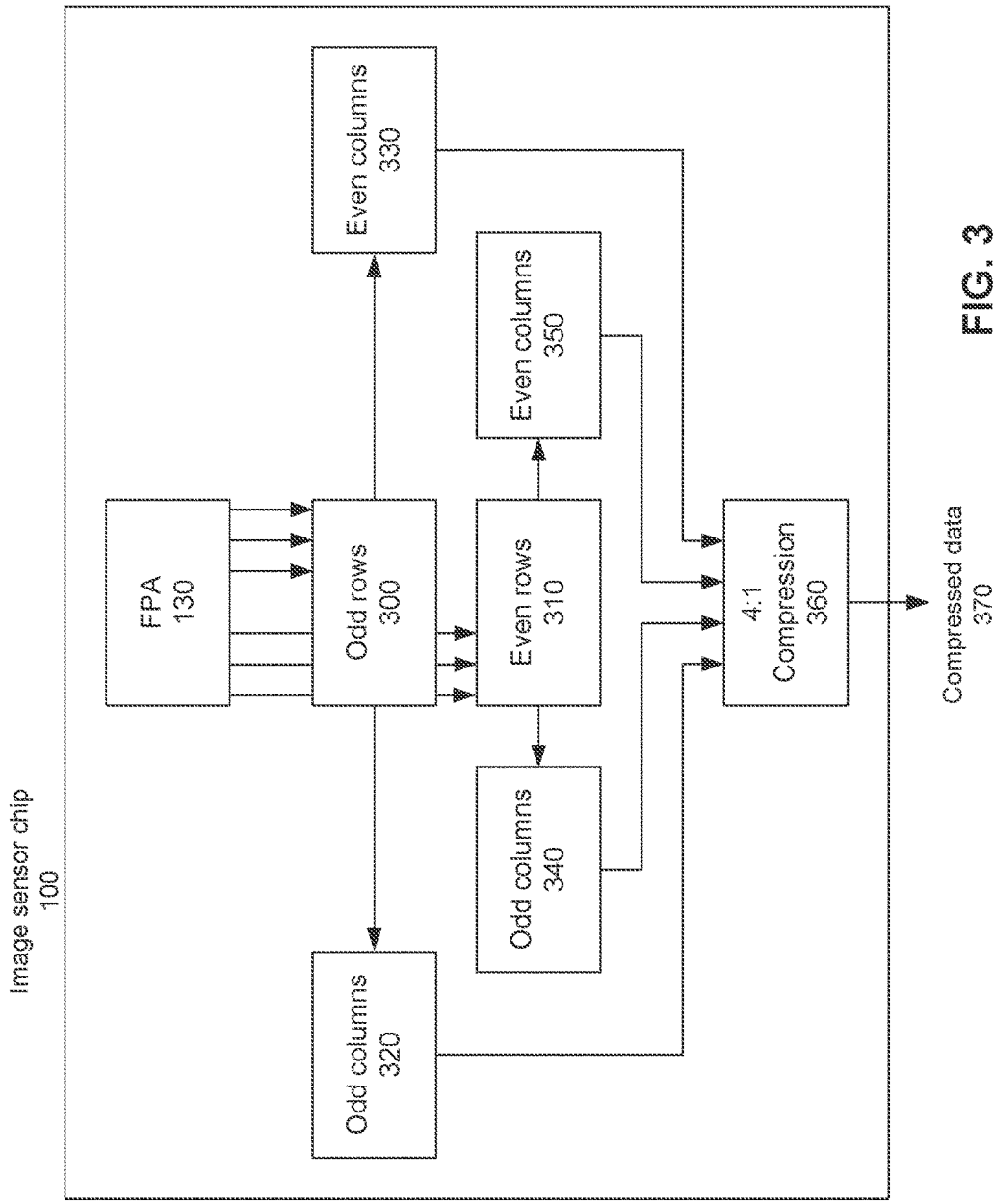
FIG. 3 is a block diagram illustrating an embodiment of an image sensor chip.
Figure 4:
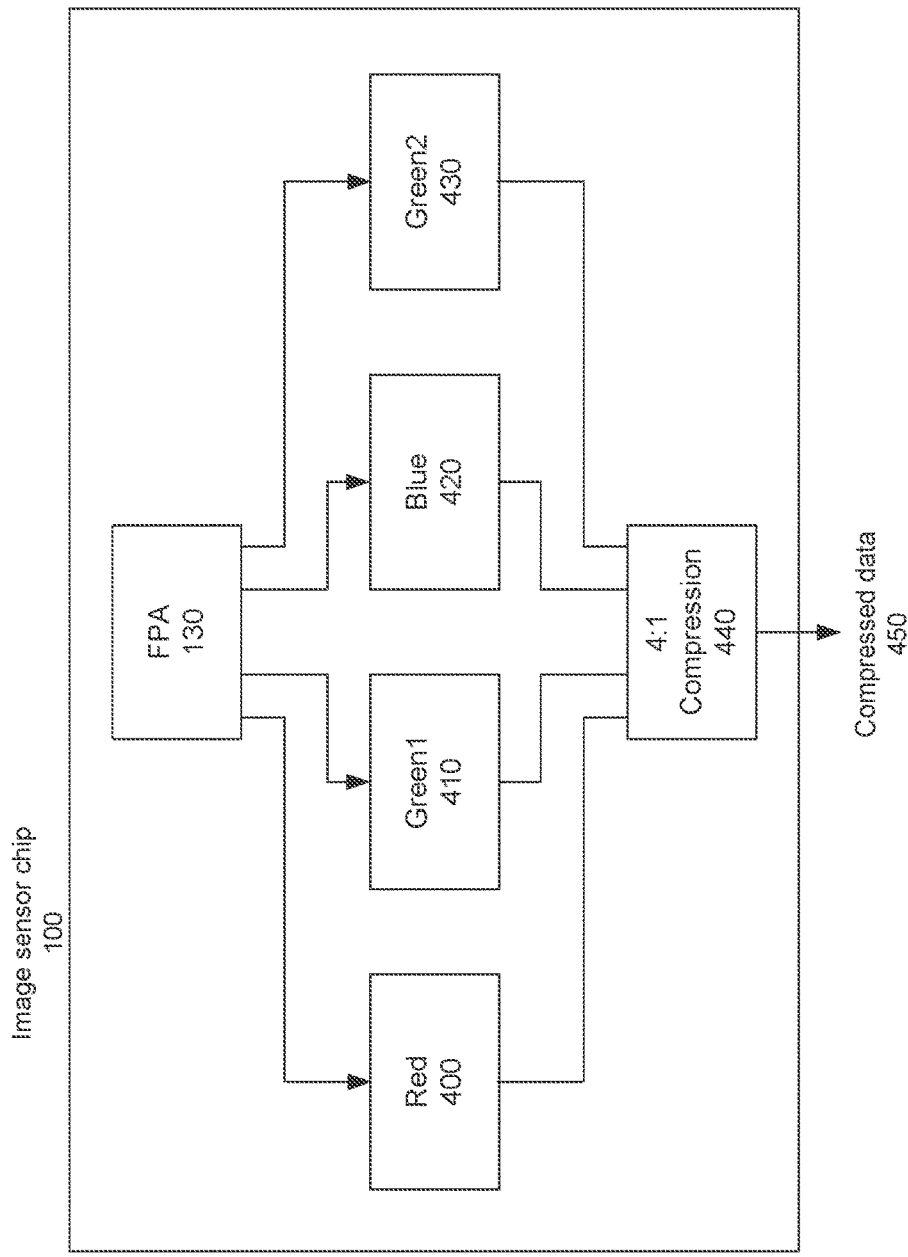
FIG. 4 is a block diagram illustrating an embodiment of an image sensor chip.

FIGS. 3 and 4 are block diagrams illustrating various embodiments of an image sensor chip. In other embodiments, the image sensor chip includes fewer, additional, or different components, which may perform different functionalities. In the embodiments of FIG. 3 and FIG. 4, pixel data is sorted into categories and compressed on the image sensor chip 100 in parallel; it should be emphasized that in other embodiments, the pixel data may not be sorted into categories prior to compression, and/or is not compressed in parallel.

In the embodiment of FIG. 3, the FPA 130 of the image sensor chip 100 outputs the odd pixel rows of the captured pixel array to the odd rows module 300 and outputs the even pixel rows of the captured pixel array to the even rows 310 module. The FPA 130 may output the odd and even pixel rows on alternating clock cycles, may output portions of the odd pixel rows in sequential clock cycles followed by portions of the even pixel rows in sequential clock cycles, or may output multiple or all even and odd pixel rows for an image in a single clock cycle.

The odd rows module 300 and the even rows module 310 may be implemented in a pixel row buffer, capable of storing and buffering the pixel rows of one or more captured images simultaneously. By buffering the odd and even pixel data of more than one image, the odd rows module 300 and the even rows module 310, respectively, are capable of compensating for slowdown by the compression engine. The performance of the compression engine may not be constant from a time-interval perspective; compressing certain images may take more time than the time it takes to transfer the images from the FPA 130 to the odd rows module 300 and the even rows module 310. Similarly, compressing certain images may take less time than the time it takes to transfer the images from the FPA 130 to the odd rows module 300 and the even rows module 310. Accordingly, so long as the average time to compress image data is less than the average time to transfer image data from the FPA 130, buffering the odd and even pixel data of images in the odd rows module 300 and the even rows module 310, respectively, allows the image sensor chip 100 to avoid a performance setback due to the variable performance of the compression engine.

The odd rows module 300 outputs odd column pixel data to the odd columns module 320 and even column pixel data to the even columns module 330. Likewise, the even rows module 310 outputs odd column pixel data to the odd columns module 340 and even column pixel data to the even columns module 350. In one embodiment, in a first clock cycle, the odd rows module 300 receives odd rows pixel data for a first image from the FPA 130. Continuing with this embodiment, in a second clock cycle, the odd rows module 300 outputs the odd and even column pixel data from the odd row pixel data of the first image to the odd columns module 320 and the even columns module 330, respectively, and the even rows module 310 receives even row pixel data for the first image from the FPA 130. In a third clock cycle, the even rows module 310 outputs the odd and even column pixel data from the even row pixel data of the first image to the odd columns module 340 and the even columns module 350, respectively, and the odd rows module 300 receives odd rows pixel data for a second image. This alternating clock cycle process may repeat for any number of images. It should be noted that in one embodiment, any number of clock cycles (such as one, two, or more than two) may be required for each of the odd rows module 300 and the even rows module 310 to both receive rows pixel data and output column pixel data.

The odd columns module 320, the even columns module 330, the odd columns module 340, and the even columns module 350 (collectively, the columns modules 320-350) output column pixel data to the 4:1 compression engine 360. Although a 4:1 compression engine 360 is illustrated in the embodiments of FIGS. 3 and 4, the compression engine may implement any amount of compression, for instance 2:1, 8:1, 16:1, and the like. The columns modules 320-350 may output column pixel data to the 4:1 compression engine 360 simultaneously (for instance in a single clock cycle), or may output column pixel data as it is received by the columns modules 320-350.

Similarly to the odd rows module 300 and the even rows module 310, the columns modules 320-350 may be implemented in pixel column buffers. In this embodiment, the pixel column data of multiple images may be stored and buffered to account for performance slowdowns by the compression engine. In the embodiment where either the odds rows module 300 and the even rows module 310, or the columns modules 320-350, or both, are implemented in buffers, the compression engine may request pixel data for an image when the compression engine is inactive. In the embodiment of FIG. 3, the 4:1 compression engine 360 may request pixel data from the odd rows module 300 and even rows module 310, or from the columns modules 320-350 for an image when the 4:1 compression engine 360 has finished compressing a previous image, when the 4:1 compression engine 360 anticipates that it will be finished compression a previous image, or any other time the compression engine 360 isn't busy or is otherwise idle.

The 4:1 compression engine 360 receives column pixel data for an image from the columns modules 320-350 and compresses the column pixel data at a 4:1 ratio. By receiving 4 distinct feeds of column pixel data, the 4:1 compression engine 360 may take advantage of the parallelism in the column pixel data in compression the data. In one embodiment, the 4:1 compression engine 360 compresses the pixel data for each image individually; in other embodiments, the 4:1 compression engine 360 compresses data incrementally across multiple sequential images. The 4:1 compression engine 360 outputs the compressed pixel data as compressed data 370.

In the embodiment of FIG. 4, the FPA 130 includes a Bayer color filter, and converts image data into a RGBG (Red, Green1, Blue, Green2) color pixel array. In this embodiment, the FPA 130 outputs the red pixel data for an image to the red module 400, outputs a first portion of the green pixel data for the image to the green1 module 410, outputs the blue pixel data for the image to the blue module 420, and outputs a second portion of the green pixel data for the image to the green2 module 430. The FPA 130 may output color pixel data for an image in a single clock cycle, or may output portions of the color pixel data in different or across multiple clock cycles.

The red module 400, the green1 module 410, the blue module 420, and the green2 module 430 output the color pixel data to the 4:1 compression engine 440. Similarly to the embodiment of FIG. 3, the red module 400, the green1 module 410, the blue module 420, and the green2 module 430 may be implemented in pixel buffers, compensating for slowdown by the 4:1 compression engine 440. Similar to the 4:1 compression engine 340, the 4:1 compression engine 440 may take advantage of the parallelism across the four color pixel data feeds. The 4:1 compression engine 440 compresses the color pixel data at a 4:1 ratio and outputs the compressed pixel data as the compressed data 450. It should be noted that the processes described in conjunction with FIGS. 3 and 4 may be embodied as instructions that may be executed by the processor 212, the memory 214, and the internal storage module 222 of the image capture device 210.

A variation of the compression described in the embodiment of FIG. 4 may also be utilized. In this variation, chroma channel differencing is employed prior to the compression of pixel data. For example, the four inputs to the 4:1 compression engine 440 may include the pixel data quantities (Green1+Green2), (Green1−Green2), (2*Red−Green1−Green2), and (2*Blue−Green1−Green2). The 4:1 compression engine 440 may compress these pixel data quantities as described above. This form of pixel data compression is described in greater detail in U.S. Pat. No. 8,014,597, the contents of which are hereby incorporated in their entirety.

Figure 5:
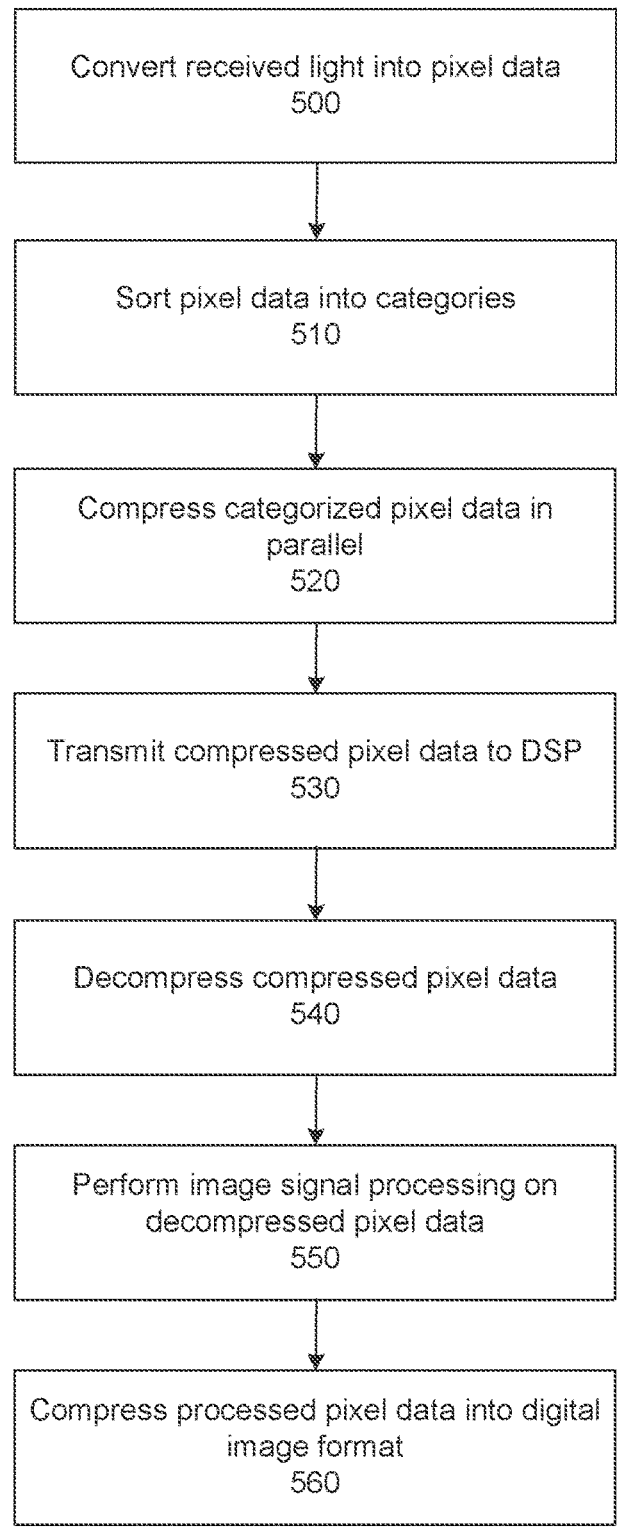
FIG. 5 illustrates an embodiment of a process for compressing pixel data prior to transmitting the data to a DSP.

FIG. 5 illustrates an embodiment of a process for compressing pixel data prior to transmitting the pixel data to a DSP. Light received by, for instance, a camera is converted 500 into pixel data. The pixel data is sorted 510 into categories, for instance by an FPA. For example, the pixel data may be sorted by column and row for a pixel array, or by color in a Bayer color filter. The categorized pixel data is compressed 520 in parallel. In one embodiment, each category of pixel data for an image is received in a distinct pixel data feed, and all categories of pixel data are received in parallel. The compression of the categorized pixel data may take into account parallelism in the pixel data, which may improve compression performance. In one embodiment, the categorized pixel data for multiple images is buffered, compensating for compression performance variances without affecting overall image capture performance.

The compressed pixel data may be transmitted 530 to a DSP. The compressed pixel data is decompressed 540. In one embodiment, the compressed pixel data may also be downscaled, and/or various image processing operations may be performed on the compressed pixel data, either before or after the compressed pixel data is decompressed. Image signal processing is performed 550 on the decompressed pixel data, and the processed pixel data is compressed into a digital image format 560. It should be emphasized that the process of the embodiment of FIG. 5 may be performed on image sequences, such as videos; in such an embodiment, each step in the process of FIG. 5 may be performed for each image in the image sequence, and the processed pixel data for the image sequence may be compressed into a digital movie format.

Compressing pixel data on an image sensor chip, prior to transmitting the pixel data to the DSP, allows for an image capture system which requires fewer pins and transmission lines between the image sensor chip and the DSP. Further, less power is required to send the compressed pixel data to the DSP; as a result, less noise is introduced into the pixel data as a result of overheating. Finally, the amount of bandwidth required to transmit the compressed pixel data is reduced, allowing for higher-resolution and higher-frame rate images and video to be captured and transmitted off the image sensor chip to the DSP.

It is noted that terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a broadcast management system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An image capture system, comprising:
    an image sensor chip configured to:
        convert light into pixel data; and
        generate compressed pixel data at a variable compression rate including applying a transform to pixel data associated with a pixel category from a plurality of pixel categories, wherein the variable compression rate is within an available bandwidth of an output bus configured to output the compressed pixel data.

2. The system of claim 1, wherein the image sensor chip comprises transform logic that transforms at least some of the pixel data on a row and column basis and outputs the transformed pixel data to a compression engine configured to generate the compressed pixel data, wherein the transform logic is configured to perform a first transformation and the compression engine is operable to perform a second transformation.

3. The system of claim 1, wherein the image sensor chip is configured to convert light into pixel data by converting electrical signals representative of the light into pixel data.

4. The system of claim 1, wherein each pixel category is associated with a group of pixel data and the transform is a wavelet transform.

5. The system of claim 4, wherein the image sensor chip is configured to generate the compressed pixel data using at least one of quantization and entropy encoding.

6. The system of claim 5, wherein the image sensor chip includes a Bayer color filter and the plurality of pixel categories include red, green1, blue, and green2 pixel categories.

7. The system of claim 5, wherein the pixel data is chroma channel differenced before the transform data is generated.

8. The system of claim 5, wherein the image sensor chip includes a plurality of pixel data feeds configured to communicate respective groups of pixel data associated with respective pixel categories of the plurality of pixel categories.

9. The system of claim 8, wherein the compressed pixel data is generated according to the plurality of pixel categories using a parallel processing technique.

10. The system of claim 1, wherein the compressed pixel data is generated using predictive encoding.

11. The system of claim 10, wherein the image sensor chip includes a color filter and the pixel categories correspond to color planes.

12. The system of claim 1, wherein the pixel data is a digital image.

13. The system of claim 1, wherein the image sensor chip is configured to adjust the variable compression rate in response to at least one of a frame capture rate and an amount of the pixel data.

14. The system of claim 1, wherein the image sensor chip is configured to receive settings for at least one of a frame capture rate and a frame resolution.

15. The system of claim 1, wherein the image sensor chip is configured to adjust the variable compression rate based on a battery power consumption.

16. The system of claim 1, wherein the image sensor chip is configured to generate compressed pixel data without using motion compensation.

17. The system of claim 1, further comprising:
    a digital signal processor chip comprising:
        a bus coupled to an output bus of the image sensor chip and configured to receive the compressed pixel data from the image sensor chip;
        hardware configured to decompress the compressed pixel data to obtain decompressed pixel data and to compress the decompressed pixel data using motion compensation.

18. The system of claim 17, wherein the digital signal processor chip is configured to convert a color mapping scheme of the decompressed pixel data before compression of the decompressed pixel data.

19. The system of claim 17, wherein the digital signal processor chip is configured to convert the decompressed pixel data from a Bayer scheme to a YUV scheme.

20. The system of claim 17, wherein the digital signal processor chip is configured to downscale the decompressed pixel data.

* * * * *